US010288435B2

(12) United States Patent
Yamamoto

(10) Patent No.: US 10,288,435 B2
(45) Date of Patent: May 14, 2019

(54) INFORMATION PROCESSING APPARATUS, INFORMATION PROCESSING METHOD, AND INFORMATION PROCESSING PROGRAM

(71) Applicant: Rakuten, Inc., Tokyo (JP)

(72) Inventor: Tadahiro Yamamoto, Tokyo (JP)

(73) Assignee: Rakuten, Inc., Tokyo (JP)

(*) Notice: Subject to any disclaimer, the term of this patent is extended or adjusted under 35 U.S.C. 154(b) by 496 days.

(21) Appl. No.: 14/893,234

(22) PCT Filed: May 24, 2013

(86) PCT No.: PCT/JP2013/064489
§ 371 (c)(1),
(2) Date: Nov. 23, 2015

(87) PCT Pub. No.: WO2014/188587
PCT Pub. Date: Nov. 27, 2014

(65) Prior Publication Data
US 2016/0123746 A1    May 5, 2016

(51) Int. Cl.
*G01C 21/34* (2006.01)
*G01C 21/36* (2006.01)
(Continued)

(52) U.S. Cl.
CPC ......... *G01C 21/3407* (2013.01); *G01C 21/20* (2013.01); *G01C 21/3679* (2013.01); *G06F 16/951* (2019.01); *G06F 16/9537* (2019.01)

(58) Field of Classification Search
CPC .................................................. G01C 21/34
(Continued)

(56) References Cited

U.S. PATENT DOCUMENTS 6,505,117 B1 * 1/2003 Ratert ................ G01C 21/3446
701/455
7,158,878 B2 * 1/2007 Rasmussen ............ G01C 21/32
701/431
(Continued)

FOREIGN PATENT DOCUMENTS

JP    8-184455 A    7/1996
JP    10-89992 A    4/1998
(Continued)

OTHER PUBLICATIONS

Implementation of an Attitude Detection and Localization Module for Micro-Aerial Vehicles Based on Arduino Platform; Jong-Hann Jean; 2016 5th IIAI Inter Congress on Advanced Applied Informatics (IIAI-AAI); pp. 1217-1218; IEEE Conferednces, year 2016.*
(Continued)

*Primary Examiner* — Cuong H Nguyen
(74) *Attorney, Agent, or Firm* — Sughrue Mion, PLLC

(57) ABSTRACT

An information processing apparatus obtains a first location of a user at a certain time and a second location of the user at a predetermined time later than the certain time. The information processing apparatus obtains a facility search request. The information processing apparatus estimates the direction in which the user will travel from the second location, based on the obtained first and second locations. When a plurality of facilities found in response to the obtained search request include a first facility not located in the estimated direction and a second facility that is located in the estimated direction and farther from the second location than the first facility, the information processing apparatus causes the second facility to be presented in preference to the first facility as a search result.

13 Claims, 11 Drawing Sheets

(51) Int. Cl.
*G06F 17/30* (2006.01)
*G06F 16/951* (2019.01)
*G01C 21/20* (2006.01)
*G06F 16/9537* (2019.01)

(58) Field of Classification Search
USPC .............. 701/426, 526; 707/706, E17.014; 340/995.1, 995.14
See application file for complete search history.

(56) References Cited

U.S. PATENT DOCUMENTS

| | | | | |
|---|---|---|---|---|
| 7,379,811 | B2* | 5/2008 | Rasmussen | G01C 21/32 701/532 |
| 7,894,984 | B2* | 2/2011 | Rasmussen | G01C 21/32 701/452 |
| 8,014,946 | B2* | 9/2011 | Rasmussen | G01C 21/32 701/439 |
| 9,234,763 | B1* | 1/2016 | Savvopoulos | G01C 21/3682 |
| 9,791,290 | B2* | 10/2017 | Kraus | G06Q 30/02 |
| 9,842,380 | B2* | 12/2017 | Rasmussen | G06T 3/40 |
| 2004/0204820 | A1 | 10/2004 | Diaz | |
| 2005/0270311 | A1* | 12/2005 | Rasmussen | G01C 21/32 345/677 |
| 2006/0235581 | A1* | 10/2006 | Petillon | B64D 45/04 701/3 |
| 2006/0271287 | A1* | 11/2006 | Gold | G01C 21/26 701/426 |
| 2006/0293850 | A1* | 12/2006 | Ahn | G01C 21/3415 701/469 |
| 2007/0096945 | A1* | 5/2007 | Rasmussen | G01C 21/32 340/995.1 |
| 2007/0156334 | A1* | 7/2007 | Vu | G01C 21/3415 701/416 |
| 2008/0291205 | A1* | 11/2008 | Rasmussen | G01C 21/32 345/441 |
| 2010/0076621 | A1* | 3/2010 | Kubotani | G08G 1/166 701/1 |
| 2010/0106397 | A1* | 4/2010 | Van Essen | G01C 21/34 701/532 |
| 2010/0201707 | A1* | 8/2010 | Rasmussen | G01C 21/32 345/620 |
| 2011/0137766 | A1* | 6/2011 | Rasmussen | G01C 21/32 705/30 |
| 2012/0075337 | A1* | 3/2012 | Rasmussen | G01C 21/32 345/629 |
| 2013/0191361 | A1* | 7/2013 | Yu | G06F 17/3087 707/706 |
| 2013/0222364 | A1* | 8/2013 | Kraus | G06Q 30/02 345/419 |
| 2015/0261858 | A1* | 9/2015 | Tang | G06F 17/30864 707/706 |
| 2015/0308854 | A1* | 10/2015 | Tanaka | G01C 21/3697 701/439 |
| 2017/0098372 | A1* | 4/2017 | Eilertsen | G08G 1/096775 |
| 2017/0210379 | A1* | 7/2017 | Obata | B60W 30/0956 |
| 2018/0336008 | A1* | 11/2018 | Nakagawa | G06F 3/0487 |

FOREIGN PATENT DOCUMENTS

| | | |
|---|---|---|
| JP | 2000-187667 A | 7/2000 |
| JP | 2002-163520 A | 6/2002 |
| JP | 2003-227723 A | 8/2003 |
| JP | 2007-271404 A | 10/2007 |
| JP | 2012-103886 A | 5/2012 |

OTHER PUBLICATIONS

A novel rollover warning method for ground vehicles based on smartphone built in GIS/GPS; Duanfeng Chu et al.; 2015 Inter Conf Transportation Information and Safety (ICTIS); pp. 393-398; IEEE Conferences; year 2015.*
Terrain-Based Vehicle Localization Using Low Cost MEMS-IMU Sensors; Hamad Ahmed et al.; 2016 IEEE 83rd Vehicular Technology Conf (VTC Spring); pp. 1-5; IEEE Conf.; year 2016.*
Azimuth angle of GPS point and its application in map-matching; Lan Li et al.; 2012 15th Inter IEEE Conf. on Intelligent Transportation Systems; pp. 796-801; IEEE Conferences; year 2012.*
International Search Report for PCT/JP2013/064489 dated Aug. 13, 2013 [PCT/ISA/210].
JPO Office Action for Application No. 2015-518022 dated 2015.

* cited by examiner

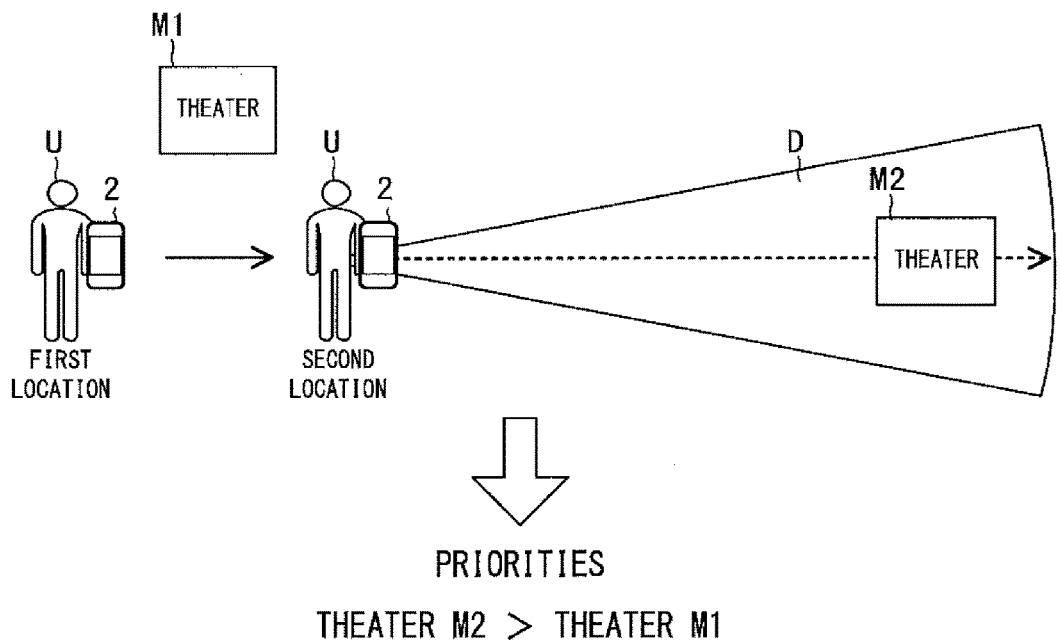

FIG.4A
MEMBER INFORMATION DB  12a

| USER ID |
| --- |
| PASSWORD |
| NICKNAME |
| NAME |
| BIRTH DATE |
| GENDER |
| ZIP CODE |
| ADDRESS |
| TELEPHONE NUMBER |
| E-MAIL ADDRESS |
| ... |

FIG.4B
THEATER INFORMATION DB  12b

| THEATER ID |
| --- |
| THEATER NAME |
| ZIP CODE |
| ADDRESS |
| TELEPHONE NUMBER |
| LOCATION INFORMATION |
| MOVIE SHOW INFORMATION |
| MOVIE SHOW INFORMATION |
| MOVIE SHOW INFORMATION |
| ... |

FIG.4C
MOVIE SHOW INFORMATION

| DATE |
| --- |
| MOVIE TITLE |
| MOVIE START TIME |
| MOVIE START TIME |
| ... |

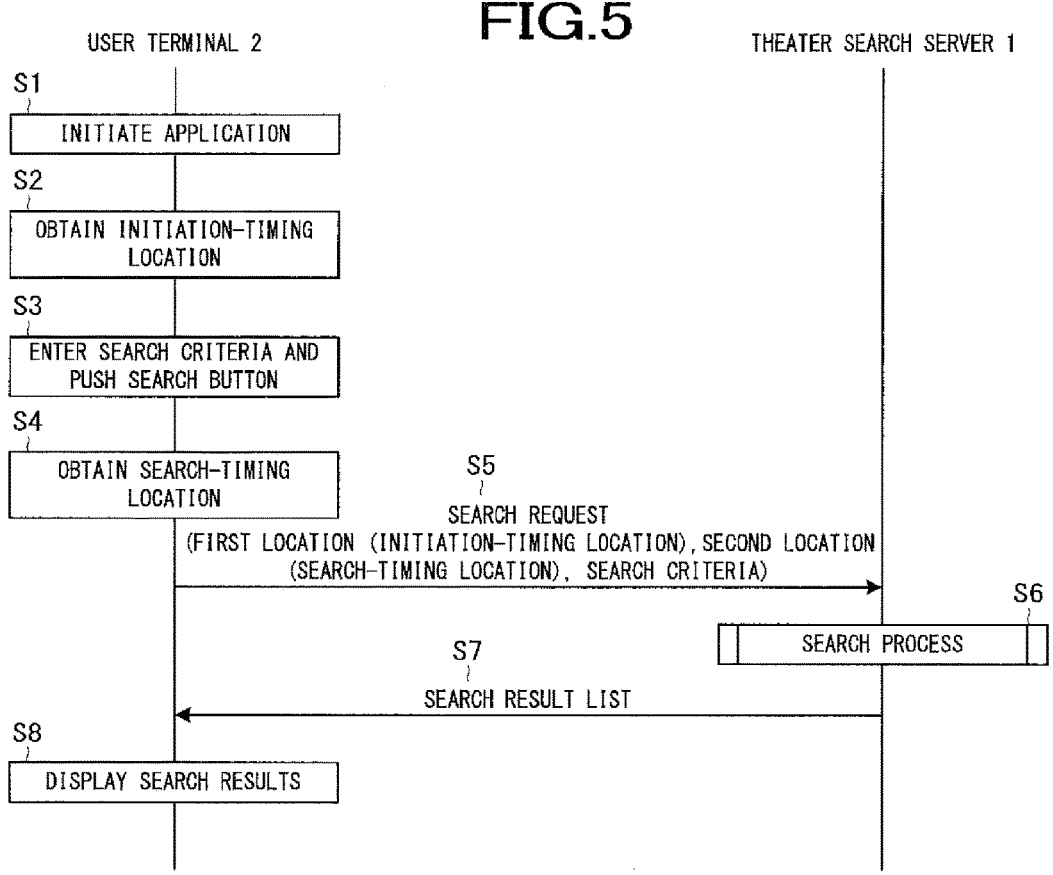

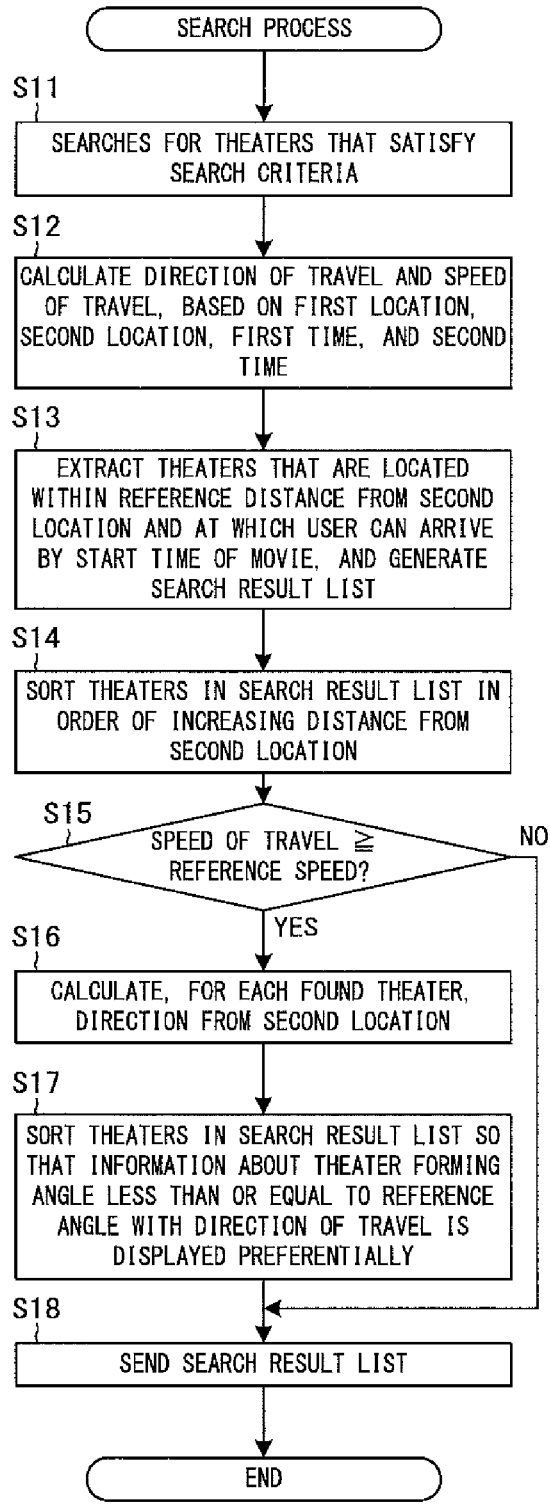

PRIORITIES

THEATER M3 > THEATER M2 > THEATER M1

INFORMATION PROCESSING APPARATUS, INFORMATION PROCESSING METHOD, AND INFORMATION PROCESSING PROGRAM

CROSS REFERENCE TO RELATED APPLICATIONS

This application is a National Stage of International Application No. PCT/JP2013/064489, filed on May 24, 2013, the contents of all of which are incorporated herein by reference in their entirety.

TECHNICAL FIELD

The present invention relates to the field of technology for searching for facilities based on a request from a user on the move and presenting found facilities.

BACKGROUND ART

In a conventionally-known technology, facilities near a user's current location are preferentially presented to the user among a plurality of found facilities (e.g., Patent Literature 1).

CITATION LIST

Patent Literature

Patent Literature 1: JP 2003-227723 A

SUMMARY OF INVENTION

Technical Problem

However, a user may be traveling in a certain direction for some reason without deciding where to go. In such a case, it may not always be useful information to the user on the move to present facilities near the user's current location, as the conventional technology.

In view of the above point, it is an object of the present invention to provide an information processing apparatus, an information processing method, and an information processing program that can present facilities to suit the convenience of a user traveling without deciding where to go.

Solution to Problem

In order to solve the above problem, the invention according to claim 1 is an information processing apparatus including: location obtaining means for obtaining a first location of a user at a certain time and a second location of the user at a predetermined time later than the certain time; request obtaining means for obtaining a facility search request; direction estimating means for estimating a direction in which the user will travel from the second location, based on the first location and the second location obtained by the location obtaining means; and control means for causing, when a plurality of facilities found in response to the search request obtained by the request obtaining means include a first facility not located in the direction estimated by the direction estimating means, and a second facility located in the direction estimated by the direction estimating means and farther from the second location than the first facility, the second facility to be presented in preference to the first facility as search results.

According to this invention, the direction in which the user will travel can be estimated based on the first and second locations, which are obtained at the times different from each other. Then, a facility located in the estimated direction from the second location is presented in preference to a facility not located in the direction from the second location. Thus, facilities to suit the convenience of the user traveling without deciding where to go can be presented. When the user is traveling with a terminal device that presents the search results, the direction in which the terminal device is facing is not always the same as the direction in which the user will travel. According to this invention, the direction in which the user will travel can be estimated based on the first and second locations. Thus, the direction can be estimated regardless of which direction the terminal device is facing in. In addition, the user does not have to enter which direction the user will travel in.

The invention according to claim 2 is the information processing apparatus according to claim 1, wherein the location obtaining means further obtains a time at which the user is at the first location and a time at which the user is at the second location, and only when a speed of travel of the user obtained based on the first location, the second location and the times obtained by the location obtaining means is greater than or equal to a predetermined speed, the control means causes the second facility to be presented in preference to the first facility.

According to this invention, only when the speed of travel of the user is greater than or equal to the predetermined speed, the second facility is presented preferentially. For example, when the user is traveling without taking any vehicle, the user may turn back to a place that the user passed. On the other hand, when the user is traveling by vehicle, the user is unlikely to turn back to a place that the user passed. A vehicle usually travels faster than the user traveling without taking any vehicle. Thus, facilities suitable for the user can be presented depending on whether the user is likely to turn back.

The invention according to claim 3 is the information processing apparatus according to claim 1 or 2, wherein the location obtaining means further obtains a time at which the user is at the first location and a time at which the user is at the second location, the information processing apparatus further comprises transportation estimating means for estimating whether the user is taking transportation based on the first location, the second location and the times obtained by the location obtaining means, the transportation runs along a predetermined route and stops at a predetermined point where passengers get off, when the transportation estimating means estimates that the user is taking the transportation, and when a plurality of facilities found in response to the search request include a third facility located in the direction estimated by the direction estimating means and nearer to the point where passengers get off than the second facility, the control means causes the third facility to be presented in preference to the second facility, and the third facility is farther from the second location than the second facility.

According to this invention, when the user is estimated to be taking the transportation, and when there are a plurality of facilities in the estimated direction of travel of the user, facilities nearer to the point where passengers get off the transportation are presented preferentially. Thus, facilities easier for the user to go to after getting off the transportation can be presented preferentially.

The invention according to claim 4 is the information processing apparatus according to anyone of claims 1 to 3, wherein, when the location obtaining means fails to obtain the second location, the direction estimating means does not estimate the direction in which the user will travel, and the control means causes one or more facilities found in response to the search request to be presented in order of priority based on the first location obtained by the location obtaining means, the information processing apparatus further includes: receiving means for receiving a selection of any facility from among the presented one or more facilities; and location estimating mean for estimating, when the location obtaining means fails to obtain the second location after the receiving means receives the selection, the second location based on the first location obtained by the location obtaining means and a location of the selected facility, and the direction estimating means estimates a direction in which the user will travel from the second location, by using the second location estimated by the location estimating means.

According to this invention, when the second location could not be obtained, the second location is estimated based on the first location and the location of the facility selected by the user from among the search results. The user is likely to travel in the direction of the facility that he or she selected. Thus, even if the second location cannot be obtained, facilities to suit the convenience of the user traveling without deciding where to go can be presented.

The invention according to claim 5 is the information processing apparatus according to any one of claims 1 to 4, further including time retrieval means for retrieving, from storage means for storing start times of events to be held at facilities, start times of events to be held at facilities found in response to the search request, wherein the control means causes facilities at which the user can arrive before an event starts to be presented, based on the second location obtained by the location obtaining means and the start times retrieved by the time retrieval means.

According to this invention, facilities at which the user can arrive before an event starts are presented. Thus, facilities in which the user can attend an event from the beginning can be presented.

The invention according to claim 6 is the information processing apparatus according to any one of claims 1 to 5, wherein the request obtaining means receives the search request including location information of the user when the search request has been accepted the location obtaining means obtains, as the second location, the location information included in the search request received by the request obtaining means.

According to this invention, the received search request includes the second location. Thus, the amount of received information can be reduced, compared with a case where the search request and the second location are received separately.

The invention according to claim 7 is an information processing method performed by a computer, the method including: obtaining a first location of a user at a certain time and a second location of the user at a predetermined time later than the certain time; obtaining a facility search request; estimating a direction in which the user will travel from the second location, based on the obtained first location and second location; and causing, when a plurality of facilities found in response to the obtained search request include a first facility not located in the estimated direction, and a second facility located in the estimated direction and farther from the second location than the first facility, the second facility to be presented in preference to the first facility as search results.

The invention according to claim 8 is an information processing program for causing a computer to function as: location obtaining means for obtaining a first location of a user at a certain time and a second location of the user at a predetermined time later than the certain time; request obtaining means for obtaining a facility search request; direction estimating means for estimating a direction in which the user will travel from the second location, based on the first location and the second location obtained by the location obtaining means; and control means for causing, when a plurality of facilities found in response to the search request obtained by the request obtaining means include a first facility not located in the direction estimated by the direction estimating means, and a second facility located in the direction estimated by the direction estimating means and farther from the second location than the first facility, the second facility to be presented in preference to the first facility as search results.

Advantageous Effects of Invention

According to the present invention, the direction in which the user will travel can be estimated based on the first and second locations, which are obtained at the times different from each other. Then, a facility located in the estimated direction from the second location is presented in preference to a facility not located in the direction from the second location. Thus, facilities to suit the convenience of the user traveling without deciding where to go can be presented.

BRIEF DESCRIPTION OF DRAWINGS

FIG. 2A is a diagram illustrating a specific example of how to determine presentation priorities.

FIG. 2B is a diagram showing example search results displayed on a user terminal 2.

FIG. 4A is a diagram showing example contents stored in a member information DB 12a.

FIG. 4B is a diagram showing example contents stored in a theater information DB 12b.

FIG. 4C is a diagram showing example contents included in movie show information.

FIG. 5 is a sequence diagram showing a process overview of the information processing system S according to an embodiment.

FIG. 6 is a flowchart showing an example of a search process in a system controller 14 of the theater search server 1 according to an embodiment.

DESCRIPTION OF EMBODIMENTS

The following describes embodiments of the present invention in detail with reference to the drawings. The embodiments described below are embodiments in which the present invention is applied to an information processing system.

Figure 1:
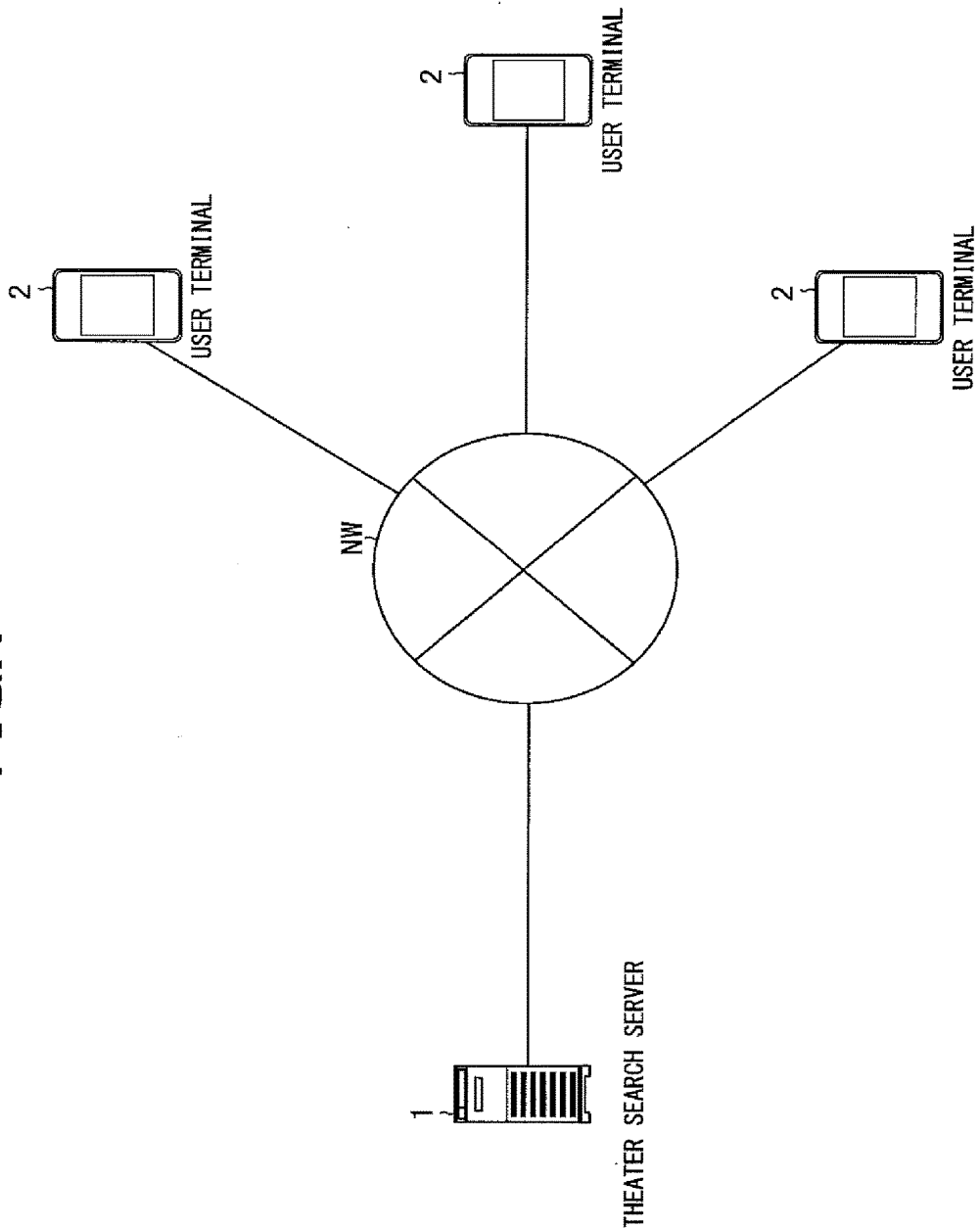
FIG. 1 is a diagram schematically showing an example configuration of an information processing system S according to an embodiment.

1. First Embodiment 1-1. Configuration and Functional Overview of Information Processing System First, a configuration and a functional overview of an information processing system S according to this embodiment are described with reference to FIG. 1. FIG. 1 is a diagram schematically showing an example configuration of the information processing system S according to this embodiment.

As shown in FIG. 1, the information processing system S includes a theater search server 1 and a plurality of user terminals 2. The theater search server 1 can exchange data with each user terminal 2 via a network NW using communication protocols, such as TCP/IP. The network NW includes, for example, the Internet, a dedicated communication line (e.g., community antenna television (CATV) line), a mobile communication network (including base stations), and a gateway.

The theater search server 1 is a server device that performs various processes for searching for theaters. The theater search server 1 is an example of an information processing apparatus according to the present invention. A theater is an example of a facility of the present invention. A movie show at a theater is an example of an event of the present invention. The theater search server 1 searches for theaters that satisfy search criteria entered by a user in response to a search request sent from the user terminal 2. The search request is a message indicating a request for a theater search. Examples of the search criteria include a theater name, a movie title, and a theater area. The theater search server 1 may search for, for example, only theaters at which the user can arrive by the start time of a movie. For example, when a user enters a movie title as search criteria, the theater search server 1 searches for theaters that will show the movie indicated by the movie title and at which the user can arrive by a start time of the movie indicated by the movie title. After searching for such theaters, the theater search server 1 sends a search result list to the user terminal 2. The search result list is a list of the found theaters.

The user terminal 2 is a terminal device of a user who uses the information processing system S. The user terminal 2 is a portable terminal device. For example, a personal digital assistant (PDA), a mobile phone, and a smartphone are used as the user terminal 2. The user terminal 2 may be, for example, an in-car terminal device. The user terminal 2 has a theater search application installed on it. The theater search application is dedicated application software for searching for theaters. The user terminal 2 sends a search request and receives a search result list by executing the theater search application. Then, the user terminal 2 displays a list of found theaters on its screen based on the search result list. For example, for each theater, the theater's name, the area where the theater is located, the start time of a movie are displayed. When the user selects any of the theaters from the list, the user terminal 2 displays detailed information about the selected theater on its screen. The user terminal 2 may use a web browser. The user terminal 2 may access the theater search server 1 through the web browser running on the terminal, and the theater search server 1 may send a web page to the user terminal 2. The theater search server 1 may cause the user terminal 2 to display search results in such a manner.

The user terminal 2 can also obtain the current location of the user terminal 2. The current location of the user terminal 2 is the current location of the user who carries the user terminal 2. For example, the user terminal 2 may obtain its current location using a global positioning system (GPS). Alternatively, for example, the user terminal 2 may obtain its current location based on the lengths of time it takes for radio waves to travel from a plurality of base stations to the user terminal 2.

When sending a search request, the user terminal 2 obtains its current location. This location is referred to as a search-timing location. The user terminal 2 sends a search request including the search-timing location to the theater search server 1. After searching for theaters, the theater search server 1 causes the user terminal 2 to present search results so that information about a theater nearer to the search-timing location is presented preferentially. The reason is, for example, that a theater nearer to the search-timing location is easier for the user to go to. For example, the theater search server 1 generates a search result list so that pieces of information about the theaters are displayed side by side downward from the top of the screen in order of increasing distance from the search-timing location.

By the way, in some cases, the user is traveling with the user terminal 2. In such a case, the user may be traveling in a certain direction for some reason without deciding where to go. For example, the user may be traveling in the general direction of where the user can finish what he or she has to do. In such a situation, it may not be useful to the user to simply present theaters near the search-timing location preferentially as search results. For example, if the user has passed the theater nearest to the search-timing location, the user may not wish to go to the theater. The reason is that the direction in which the user wishes to travel differs from the direction of the theater. Moreover, the user has not decided where to go. Thus, for example, it is impossible to preferentially present theaters near his or her destination.

For these reasons, the theater search server 1 presents theaters to suit the convenience of a user traveling without deciding where to go. Specifically, the theater search server 1 obtains a first location and a second location as the user's locations. The first location is the user's location at a predetermined time. The second location is the user's location at a predetermined time later than the time when the user was at the first location. The theater search server 1 estimates the direction in which the user will travel, based on the first and second locations. Specifically, the search server 1 determines the direction from the first location to the second location as the direction of travel of the user. Then, the theater search server 1 causes a theater located in the direction of travel from the second location to be presented in preference to a theater not located in the direction of travel from the second location. Thus, when there are a first theater not located in the direction of travel and a second theater which is located in the direction of travel and farther from the second location than the first theater, the theater search server 1 causes the second theater to be presented in preference to the first theater. The reason is that a theater located in the direction of travel from the second location is easier for the user on the move to go to. Even if the second theater is nearer to the second location than the first theater, the theater search server 1 causes the second theater to be presented in preference to the first theater.

Examples of conventional devices that detect a direction of travel include a gyroscope sensor and an acceleration sensor. For example, some in-car navigation devices include a gyroscope sensor. When an automobile moves forward, the automobile moves in the direction in which the automobile is facing, that is, in the direction toward its headlights. The navigation device can detect the direction in which the automobile is facing, using the gyroscope sensor. Thus, the navigation device can detect in which direction the automobile will travel, using the gyroscope sensor. The portable user terminal 2 may also include, for example, a gyroscope sensor or an acceleration sensor. The user terminal 2 may be able to detect the direction in which the user terminal 2 is facing, using such a sensor. The direction in which the user terminal 2 is facing may be, for example, the direction parallel to the screen of the user terminal 2 and toward the upper edge of the screen. However, when the user is traveling with the user terminal 2, the direction in which the user terminal 2 is facing is not always the same as the direction in which the user will travel. Moreover, the direction in which the user terminal 2 faces sometimes changes independently of the direction in which the user travels. Thus, the gyroscope sensor, the acceleration sensor, or the like cannot detect the direction of travel of the user. By contrast, the theater search server 1 estimates the direction of travel based on the first and second locations. Thus, the theater search server 1 can estimate the direction of travel regardless of the direction in which the user terminal 2 is facing. In addition, the user does not have to enter the direction of travel into the user terminal 2.

The first location may be, for example, the location at the time of initiating the theater search application. This location is referred to as an initiation-timing location. In this case, the second location may be, for example, the search-timing location. When a plurality of search requests are made after the theater search application is initiated, the second location may be, for example, the search-timing location at the time of the last search request. In this case, the first location may be, for example, the search-timing location at the time of the second last search request. Alternatively, for example, the user terminal 2 may periodically send its current location to the theater search server 1. In this case, the second location may be, for example, the latest location, and the first location may be, for example, the second latest location.

FIG. 2A is a diagram illustrating a specific example of how to determine presentation priorities. FIG. 2A illustrates an example process when the first location is the initiation-timing location and the second location is the search-timing location. Assume that the upward direction in FIG. 2A corresponds to the north. As illustrated in FIG. 2A, after the theater search application is initiated, a user U travels eastward. After that, the user U operates the user terminal 2 to request a theater search. In this case, the second location is to the east of the first location. Thus, the theater search server 1 estimates that the direction of travel of the user U is eastward. Here, assume that theaters M1 and M2 are found. The distance from the second location to the theater M2 is greater than the distance from the second location to the theater M1. However, the theater M1 is to the northwest of the second location. On the other hand, the theater M2 is to the east of the second location. Thus, the theater search server 1 causes the theater M2 to be presented in preference to the theater M1 as search results. FIG. 2B is a diagram showing example search results displayed on the user terminal 2. As shown in FIG. 2B, in order from the top, information about the theater M2 and information about the theater M1 are displayed.

The theater search server 1 may estimate a certain range of directions of travel. For example, assume that the second location is to the east of the first location. In this case, for example, the theater search server 1 may estimate, as the direction range of travel, a range in which the angle between the east direction and the direction from the second location to a theater is within a predetermined reference angle. The range specified by the second location, the reference angle, and a reference distance is referred to as the estimated range of travel. The theater search server 1 causes a theater inside the estimated range of travel to be presented in preference to a theater outside the estimated range of travel as search results. In FIG. 2A, a range D is the estimated range of travel.

The theater search server 1 may cause theaters located in the estimated direction of travel to be preferentially presented only when the speed of travel of the user is greater than or equal to a predetermined reference speed, and cause theaters near the second location to be preferentially presented when the speed of travel of the user is less than the predetermined reference speed. The reference speed is, for example, the speed of travel of a vehicle. Examples of the vehicle include a train and an automobile. The reason to perform the above control is that the user is more likely to travel in the estimated direction of travel when the user is traveling by vehicle than when the user is walking. When the user is on a vehicle, it is not easy for the user to turn back halfway. Thus, it is useful to preferentially present theaters located in the estimated direction of travel. On the other hand, it is easy for the user to turn around and go back while walking. Thus, it is useful to preferentially present theaters near the second location. The theater search server 1 calculates the speed of travel of the user, based on the first location, the second location, the time at which the user terminal 2 obtained the first location, and the time at which the user terminal 2 obtained the second location. The time at which a first location is obtained is referred to as a first time. The time at which a second location is obtained is referred to as a second time.

1-2. Configuration of Theater Search Server

The following describes a configuration of the theater search server 1 with reference to FIGS. 3 and 4.

Figure 3B:
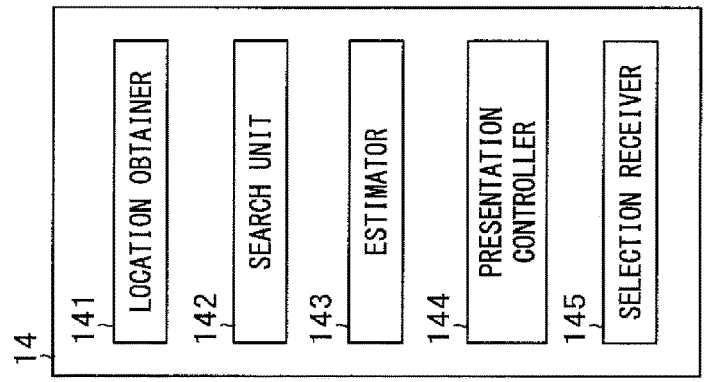
FIG. 3B is a diagram showing example functional blocks of the theater search server 1 according to an embodiment.
Figure 3A:
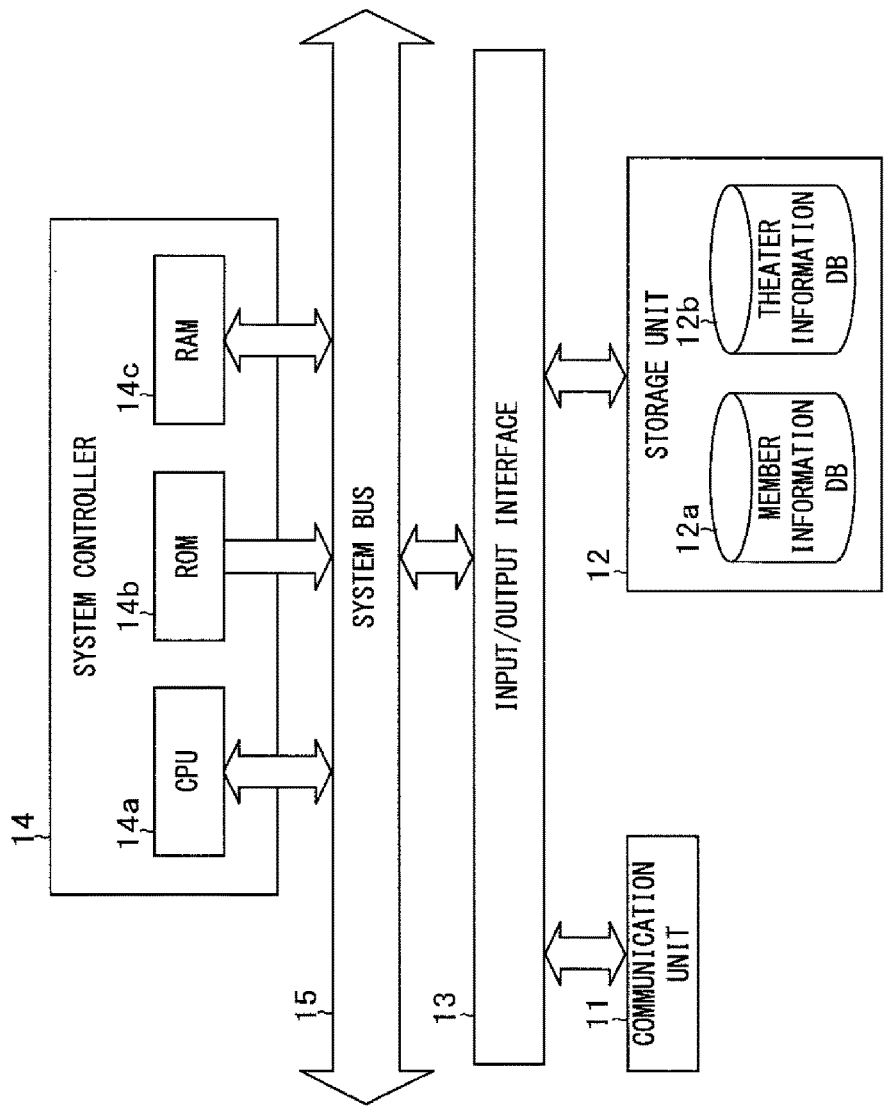
FIG. 3A is a block diagram schematically showing an example configuration of a theater search server 1 according to an embodiment.

FIG. 3A is a block diagram schematically showing an example configuration of the theater search server 1 according to this embodiment. As shown in FIG. 3A, the theater search server 1 includes a communication unit 11, a storage unit 12, an input/output interface 13, and a system controller 14. The system controller 14 and the input/output interface 13 are connected via a system bus 15.

The communication unit 11 connects to the network NW and controls the state of communications with, for example, the user terminal 2.

The storage unit 12 includes, for example, hard disk drives. The storage unit 12 is an example of storage means. In this storage unit 12, a member information DB 12a, a theater information DB 12b, and other databases have been created. "DB" is an abbreviation for "database".

FIG. 4A is a diagram showing example contents stored in the member information DB 12a. The member information DB 12a stores user information about users who use a theater search site. Specifically, the member information DB 12a stores, in association with each user, the user's user ID, password, nickname, name, birth date, gender, zip code, address, telephone number, e-mail address, and other user attributes. The user ID is identification information of the user.

FIG. 4B is a diagram showing example contents stored in the theater information DB 12b. The theater information DB 12b stores theater information about theaters. Specifically, the theater information DB 12b stores, in association with each theater, the theater's theater ID, theater name, zip code, address, telephone number, location information, a plurality of pieces of movie show information, and other information. The theater ID is identification information of the theater. The location information indicates the location of the theater. For example, the location information may be the longitude and latitude of the theater.

FIG. 4C is a diagram showing example contents included in the movie show information. The movie show information is information about a movie that will be shown at the theater. The movie show information is stored for each movie and each date on which the movie will be shown. Specifically, the movie show information includes, for example, a date, a movie title, and one or more start times of the movie. Each start time is a time at which the movie will start.

The following describes other information stored in the storage unit 12. The storage unit 12 stores various data, such as HTML documents, extensible markup language (XML) documents, image data, text data, and electronic documents, for displaying web pages. The storage unit 12 also stores various setting values, threshold values, constants, and the like.

The storage unit 12 also stores various programs, such as an operating system, a World Wide Web (WWW) server program, a database management system (DBMS), and a theater search management program. The theater search management program is a program for performing various processes related to, for example, searching for theaters and controlling the presentation of search results. The theater search management program is an example of an information processing program according to the present invention. For example, the various programs may be available from another server device or the like via the network NW, or may be recorded in a recording medium, such as a digital versatile disc (DVD), and be read via a drive device. The theater search management program may be a program product.

The input/output interface 13 performs interface processing between the communication unit 11 and the storage unit 12, and the system controller 14.

FIG. 3B is a diagram showing example functional blocks of the theater search server 1 according to this embodiment. The system controller 14 includes, for example, a CPU 14a, a read only memory (ROM) 14b, and a random access memory (RAM) 14c. As shown in FIG. 3B, the various programs, read and executed by the CPU 14a, enable the system controller 14 to function as a location obtainer 141, a search unit 142, an estimator 143, a presentation controller 144, and a selection receiver 145. The location obtainer 141 is an example of location obtaining means of the present invention. The search unit 142 is an example of request obtaining means and time retrieval means of the present invention. The estimator 143 is an example of direction estimating means, transportation estimating means, and location estimating means of the present invention. The presentation controller 144 is an example of control means of the present invention. The selection receiver 145 is an example of receiving means of the present invention.

The location obtainer 141 obtains first location information and second location information of the user. The first location information is information indicating the first location, and the second location information is information indicating the second location. For example, the first location and the second location may be each indicated by a longitude and a latitude. For example, the user terminal 2 sends a search request including the first location information and the second location information to the theater search server 1. The location obtainer 141 obtains the first location information and the second location information from the search request. Then, the search unit 142 obtains the search request sent from the user terminal 2 via the communication unit 11. The search unit 142 also searches for theaters in accordance with the obtained search request.

The estimator 143 estimates the direction of travel of the user based on the first and second locations obtained by the location obtainer 141. The presentation controller 144 determines priorities in presenting theaters as search results based on the direction of travel estimated by the estimator 143. Specifically, in a search result list, pieces of information about found theaters are sorted. Then, the presentation controller 144 sends the search result list to the user terminal 2. By sending the search result list, the presentation controller 144 causes the user terminal 2 to present theaters located in the direction of travel from the second location in preference to theaters not located in the direction of travel from the second location as search results.

The selection receiver 145 receives a user selection of a theater from among the theaters presented as the search results. For example, when the user selects any of the theaters, the user terminal 2 sends a detailed information request to the theater search server 1. The detailed information request is a message indicating a request for detailed information about the theater. The detailed information request includes, for example, the theater ID of the selected theater. The selection receiver 145 receives the selection by obtaining the detailed information request via the communication unit 11.

The theater search server 1 may include a plurality of server devices. For example, a server device that searches for theaters and controls the presentation of search results, a server device that manages databases, and other server devices may be connected to each other via a LAN or the like.

1-3. Operation of Information Processing System

The following describes an operation of the information processing system S with reference to FIGS. 5 and 6.

FIG. 5 is a sequence diagram showing a process overview of the information processing system S according to this embodiment. As shown in FIG. 5, the user terminal 2 initiates the theater search application in response to a user operation (Step S1). Then, the user terminal 2 obtains initiation-timing location information as first location information, for example, using a GPS (Step S2). The user terminal 2 also obtains the current time as a first time. After that, the user enters search criteria by operating the user terminal 2 and pushes a search button displayed on the screen (Step S3). Then, the user terminal 2 obtains search-timing location information as second location information, for example, using the GPS (Step S4). The user terminal 2 also obtains the current time as a second time. Subsequently, the user terminal 2 generates a search request including the first location information, the second location information, the first time, the second time, the search criteria, and the user ID of the user of the user terminal 2. When a plurality of search requests are made after the theater search application is initiated, for example, the first location information may be the search-timing location information obtained at the time of the last search request, and the first time may be the time obtained at the time of the last search request. The second location information may be the search-timing location information obtained at the time of this search request, and the second time may be the time obtained at the time of this search request. The user terminal 2 sends the generated search request to the theater search server 1 (Step S5).

The theater search server 1, which has received the search request, performs a search process (Step S6). In the search process, the theater search server 1 searches for theaters and generates a search result list. The search process is described in detail below. Subsequently, the theater search server 1 sends the search result list to the user terminal 2 (Step S7). The user terminal 2 displays, for example, search results as shown in FIG. 2B based on the received search result list (Step S8).

FIG. 6 is a flowchart showing an example of the search process in the system controller 14 of the theater search server 1 according to this embodiment. As shown in FIG. 6, after obtaining the search request, the search unit 142 searches for theaters that satisfy the search criteria included in the search request (Step S11). For example, when a keyword indicating a theater name is entered as the search criteria, the search unit 142 searches for theaters whose name includes the keyword, based on the theater names stored in the theater information DB 12*b*. Alternatively, for example, when a keyword indicating a movie title is entered as the search criteria, the search unit 142 searches for theaters that will show the movie whose title includes the keyword, based on the pieces of movie show information stored in the theater information DB 12*b*.

Subsequently, the location obtainer 141 obtains the first location information, the second location information, the first time, and the second time from the search request. Then, the estimator 143 calculates the direction and speed of travel of the user (Step S12). For example, the estimator 143 calculates the angle between the north direction and the position vector of the second location with respect to the first location as the direction of travel. The estimator 143 also calculates the speed of travel by dividing the distance from the first location to the second location by the time elapsed from the first time to the second time.

Subsequently, the search unit 142 extract, from among found theaters, theaters that are located within the reference distance from the second location and at which the user can arrive before a movie starts. Then, the search unit 142 generates a search result list (Step S13). Specifically, the search unit 142 retrieves the location information of each found theater from the theater information DB 12*b*. The search unit 142 calculates the distance from the second location to the location indicated by the location information. The search unit 142 determines that a theater whose calculated distance is less than or equal to the reference distance stored in the storage unit 12 is located within the reference distance from the second location. The search unit 142 also obtains a movie start time from movie show information including the date of today, among the pieces of movie show information of each found theater. When a movie title is entered as the search criteria, the search unit 142 obtains a start time of the movie indicated by the movie title. When search criteria different from any movie title are entered, the search unit 142 may obtain, for example, the start time of a movie that will be shown at the end. The search unit 142 also calculates when the user is estimated to arrive at each found theater. For example, the search unit 142 may calculate a travel time by dividing the distance from the second location to the theater by the speed of travel calculated in S12. Then, the search unit 142 may calculate an estimated time of arrival based on the travel time. Alternatively, the search unit 142 may calculate an estimated time of arrival, for example, using a preset speed of travel, instead of the speed of travel calculated in Step S12. For example, the search unit 142 determines that a theater whose estimated time of arrival is earlier than the start time of the movie is a theater at which the user can arrive before the movie starts. After extracting theaters, the search unit 142 generates a search result list including pieces of information about the extracted theaters. The information about each theater includes, for example, the theater's theater ID, the theater's name, the name of the area where the theater is located, the titles of movies to be shown there, and the start times of the movies.

Subsequently, the presentation controller 144 sorts the pieces of information about the theaters in the search result list in order of increasing distance from the second location (Step S14).

Then, the presentation controller 144 determines whether the speed of travel calculated in the Step S12 is greater than or equal to the reference speed stored in storage unit 12 (Step S15). Here, if the presentation controller 144 determines that the speed of travel is greater than or equal to the reference speed (YES in Step S15), the process proceeds to Step S16. On the other hand, if the presentation controller 144 determines that the speed of travel is less than the reference speed (NO in Step S15), the process proceeds to Step S18.

In Step S16, the presentation controller 144 calculates, for each found theater, the direction from the second location to the theater. Next, the presentation controller 144 calculates, for each theater, the angle between the direction calculated in Step S16 and the direction of travel calculated in Step S12. Subsequently, the presentation controller 144 compares the calculated angle with the reference angle stored in the storage unit 12. Then, the presentation controller 144 sorts the pieces of information in the search result list so that information about a theater whose calculated angle is less than or equal to the reference angle is arranged before information about a theater whose calculated angle is greater than the reference angle in the search result list (Step S17). If there are a plurality of theaters whose calculated angle is less than or equal to the reference angle, for example, the presentation controller 144 sorts, among the plurality of theaters, the pieces of information about these theaters in order of increasing distance from the second location. Next, the presentation controller 144 causes the process to proceed to Step S18.

In Step S18, the presentation controller 144 sends the search result list in which the pieces of information were sorted in Step S14 or the search result list in which the pieces of information were sorted in Step S17 to the user terminal 2. After Step S18, The presentation controller 144 terminates the search process. The user terminal 2 displays the pieces of information included in the search result list in order from top to bottom on its screen in accordance with the sorting order of the pieces of information in the search result list.

As described above, according to this embodiment, the system controller 14 of the theater search server 1 obtains the first location of a user at a certain time and the second location of the user at a predetermined time later than the certain time. The system controller 14 also obtains a theater search request. Subsequently, the system controller 14 estimates the direction of travel of the user based on the obtained first and second locations. Then, when a plurality of theaters found in response to the obtained search request include a theater M1 not located in the estimated direction and a theater M2 that is located in the estimated direction and farther from the second location than the theater M1, the system controller 14 causes the theater M2 to be presented in preference to the theater M1 as search results. Thus, theaters to suit the convenience of the user traveling without deciding where to go can be presented.

In addition, the system controller 14 further obtains the first time at which the user was at the first location and the second time at which the user was at the second location. Then, only when the speed of travel of the user, which is obtained based on the obtained first and second locations and the obtained times, is greater than or equal to the reference speed, the system controller 14 causes the theater M2 to be presented in preference to the theater M1. Thus, theaters suitable for the user can be presented depending on whether the user is likely to turn back.

In addition, the system controller 14 retrieves, from the storage unit 12, the movie start times of the theaters found in response to the search request. Then, based on the obtained second location and the retrieved movie start times, the system controller 14 causes theaters at which the user can arrive before a movie starts to be presented. Thus, theaters in which the user can watch a movie from the beginning can be presented.

In addition, the system controller 14 receives a search request including the search-timing location information of the user when the user terminal 2 accepted a search request. Then, the system controller 14 obtains the search-timing location information included in the received search request as the second location. Thus, the amount of received information can be reduced, compared with a case where the search request and the second location are received separately.

2. Second Embodiment

Figure 7:
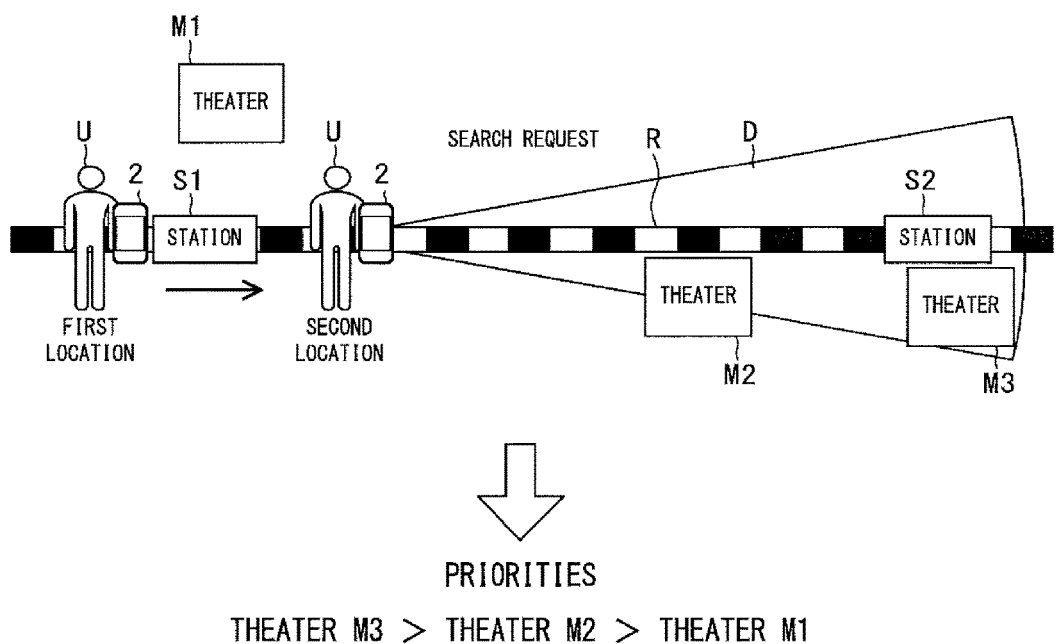
FIG. 7 is a diagram illustrating a specific example of how to determine presentation priorities.
Figure 8:
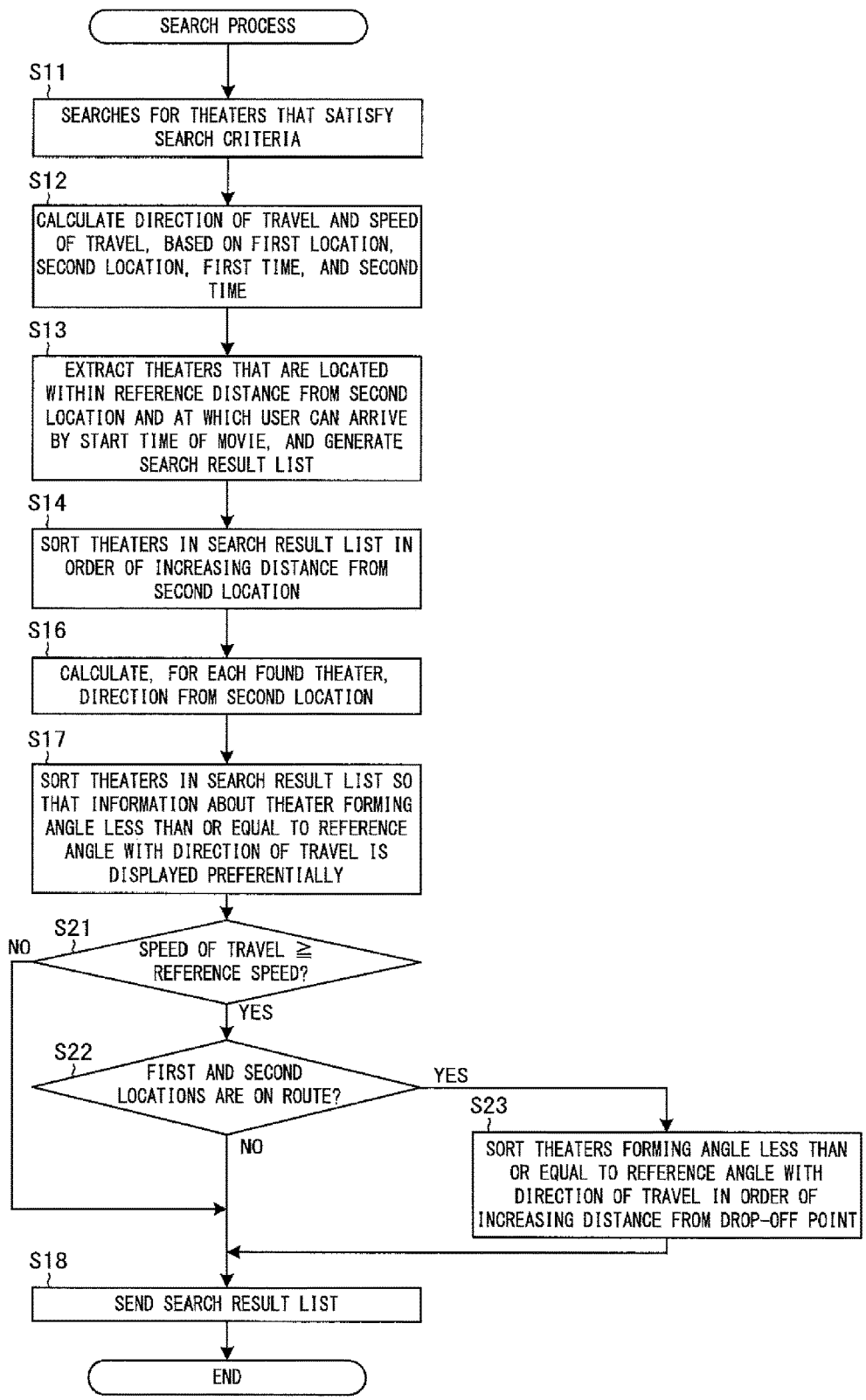
FIG. 8 is a flowchart showing an example of the search process in the system controller 14 of the theater search server 1 according to an embodiment.

The following describes a second embodiment with reference to FIGS. 7 and 8. In this embodiment, the theater search server 1 estimates whether a user is taking predetermined transportation. Then, the theater search server 1 controls priorities in presenting found theaters based on the estimation result.

A user may travel by transportation that runs along a predetermined route and stops at predetermined drop-off points. Examples of such transportation include a train and a route bus. Examples of the predetermined route include a railroad and a regular route. The drop-off points are points at which passengers can get off the transportation. The drop-off points may include, for example, points at which passengers can both take and get off the transportation and points at which passengers can only get off. Examples of the drop-off points include stations and bus stops. A user taking transportation will get off a predetermined point and then walks to a theater. In the first embodiment, when there are a plurality of theaters located in the estimated direction of travel from the second location, pieces of information about theaters nearer to the second are presented preferentially. However, such priorities in presenting search results may not be useful information to a user taking the predetermined transportation.

FIG. 7 is a diagram illustrating a specific example of how to determine presentation priorities. FIG. 7 illustrates a case where the transportation is a train. As illustrated in FIG. 7, there are stations S1 and S2 on a railroad R. After the theater search application is initiated, the user U gets on a train for the station S2 at the station S1. After that, the user requests for a search while the train is traveling. In this case, the direction of travel of the user U is the direction from the station S1 to the station S2. Thus, the estimated range of travel is a range D shown in FIG. 7. Here, assume that theaters M1, M2, and M3 are found. The distance from the second location to the theater M2 is greater than the distance from the second location to the theater M1. The distance from the second location to the theater M3 is greater than the distance from the second location to the theater M2. The theater M1 is outside the range D, and the theaters M2 and M3 are inside the range D. Thus, in the first embodiment, the first priority is the theater M2, followed by the theater M3 and the theater M1 in descending order.

The user U, who is traveling from the station S1 to the station S2 by train, may get off at the station S2. Among the theaters M1 to M3, the theater M3 is nearest to the station S2, followed by the theater M2. While traveling to the station S2, the train passes the theater M2. Thus, if the user gets off the train at the station S2 to walk, it is easier for the user to go to the theater M3 than the theater M2.

For this reason, when there are a second theater located in the estimated direction of travel and the third theater that is located in the estimated direction of travel, farther from the second location than the second theater, and nearer to a drop-off point, at which passengers get off, than the second theater, if a user is estimated to be taking predetermined transportation, the theater search server 1 causes the third theater to be presented in preference to the second theater as search results. Consequently, in the example of FIG. 7, the first priority is the theater M3, followed by the theater M2 and the theater M1 in descending order.

To estimate whether the user is taking the transportation, a transportation information DB has been created in the storage unit 12 of the theater search server 1. The transportation information DB stores, for example, route information and drop-off point information. The route information is information about routes of the transportation. For example, assume that each point through which a route passes is defined as a node, and the route is indicated by a link connecting individual nodes. In this case, for example, the route information includes, for each node, its node ID, positional information, the node ID(s) of other node(s) to which the node is connected by the link. The node ID is identification information of the node. The drop-off point information is information about drop-off points. For example, the drop-off point information includes, for each drop-off point, the name of the drop-off point and the node ID of the node at which the drop-off point is located.

The theater search server 1 estimates whether the user is taking the predetermined transportation, based on the first location, the second location, the first time, the second time, and the transportation information DB. For example, if the theater search server 1 determines that the user is traveling at a speed faster than the reference speed from a certain point to another point on a railroad, the theater search server 1 determines that the user is taking the predetermined transportation.

FIG. 8 is a flowchart showing an example of the search process in the system controller 14 of the theater search server 1 according to this embodiment. In FIG. 8, the same steps as those shown in FIG. 6 are denoted by the same reference signs. As shown in FIG. 8, Steps S11 to S14 are performed. Subsequently, Steps S16 and S17 are performed. Then, the estimator 143 determines whether the speed of travel calculated in the Step S12 is greater than or equal to the reference speed (Step S21). Here, if the estimator 143 determines that the speed of travel is greater than or equal to the reference speed (YES in Step S21), the process proceeds to Step S22. On the other hand, if the estimator 143 determines that the speed of travel is less than the reference speed (NO in Step S21), the process proceeds to Step S18.

In Step S22, the estimator 143 determines whether both the first and second locations are on a route of the transportation, based on the route information stored in the transportation information DB. Here, even if the distance between the first location and the location of the route is less than a predetermined value, the estimator 143 may determine that the first location is on the route. The same applies to the second location. If the estimator 143 determines that both the first and second locations are on the route (YES in Step S22), the process proceeds to Step S23. On the other hand, if the estimator 143 determines that at least one of the first and second locations is not on the route (NO in Step S22), the process proceeds to Step S18.

In Step S23, the presentation controller 144 sorts, in the search result list, the pieces of information about the theaters whose angle calculated in Step S16 is less than or equal to the reference angle in order of increasing distance from a drop-off point of the transportation. Specifically, the presentation controller 144 obtains the node ID of each drop-off point, from the drop-off point information stored in the transportation information DB. Subsequently, the presentation controller 144 obtains the location information corresponding to the node ID, from the route information stored in the transportation information DB. At this time, the presentation controller 144 may obtain, for example, the location information of only a drop-off point which the transportation traveling along the route, in the direction of travel from the second location, will pass. In the example of FIG. 7, the location information of the station S2 is obtained, but the location information of the station S1 is not obtained. The presentation controller 144 calculates the distances between the drop-off point and each theater whose angle calculated in Step S16 is less than or equal to the reference angle, based on the obtained location information. Then, the presentation controller 144 sorts the pieces of information about the theaters in increasing order of the calculated distances. When there are a plurality of drop-off points, the presentation controller 144 may sort the pieces of information about the theaters, for example, using the distance between each theater and the drop-off point nearest to the theater among the plurality of drop-off points. After the presentation controller 144 finishes Step S23, the process proceeds to Step S18.

As described above, according to this embodiment, the system controller 14 estimates whether a user is taking predetermined transportation based on the obtained first and second locations and the obtained times. Then, when the user is estimated to be taking the predetermined transportation, and when a plurality of theaters found in response to a search request include the theater M3 that is located in the estimated direction, farther from the second location than the theater M2, and nearer to a drop-off point than the theater M2, the system controller 14 causes the theater M3 to be presented in preference to the theater M2. Thus, theaters easier for the user to go to after getting off the transportation can be presented preferentially.

In the example of FIG. 8, even when the speed of travel of the user is less than the reference speed, a theater located in the estimated direction of travel is presented in preference to a theater not located in the estimated direction of travel as search results. However, as in the example of FIG. 6, when the speed of travel of the user is less than the reference speed, even a theater that is not located in the estimated direction of travel but near the second location may be presented preferentially.

3. Third Embodiment

Figure 9A:
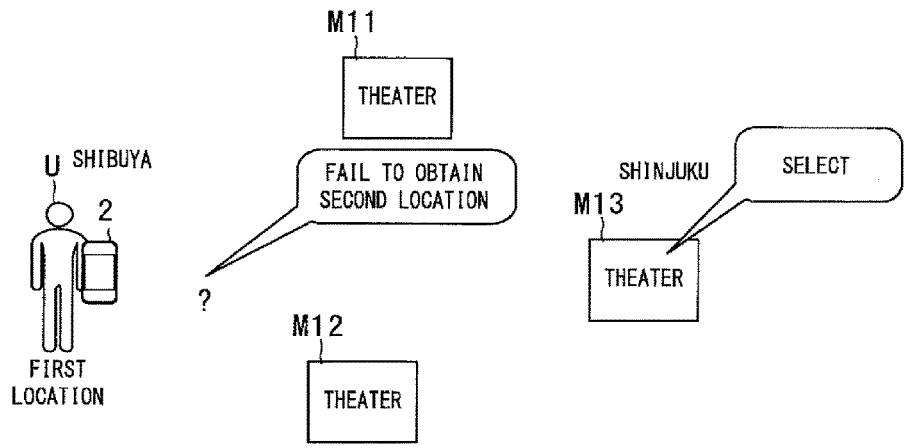
FIGS. 9A and 9B are each a diagram illustrating a specific example of how to estimate a second location.
Figure 9B:
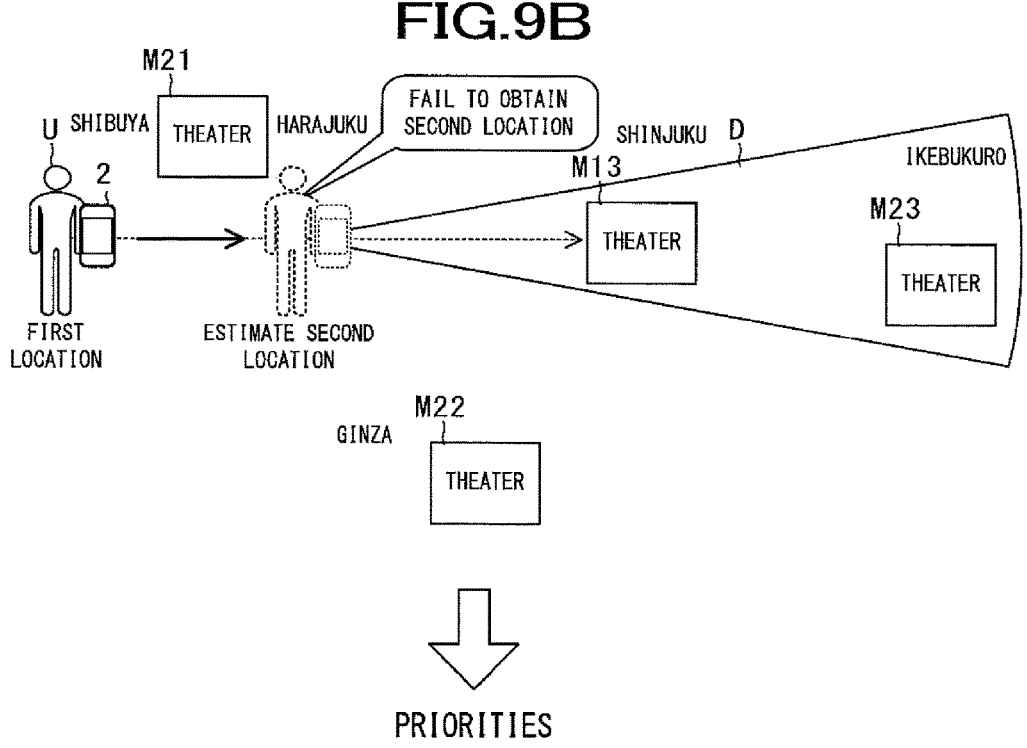
Figure 10:
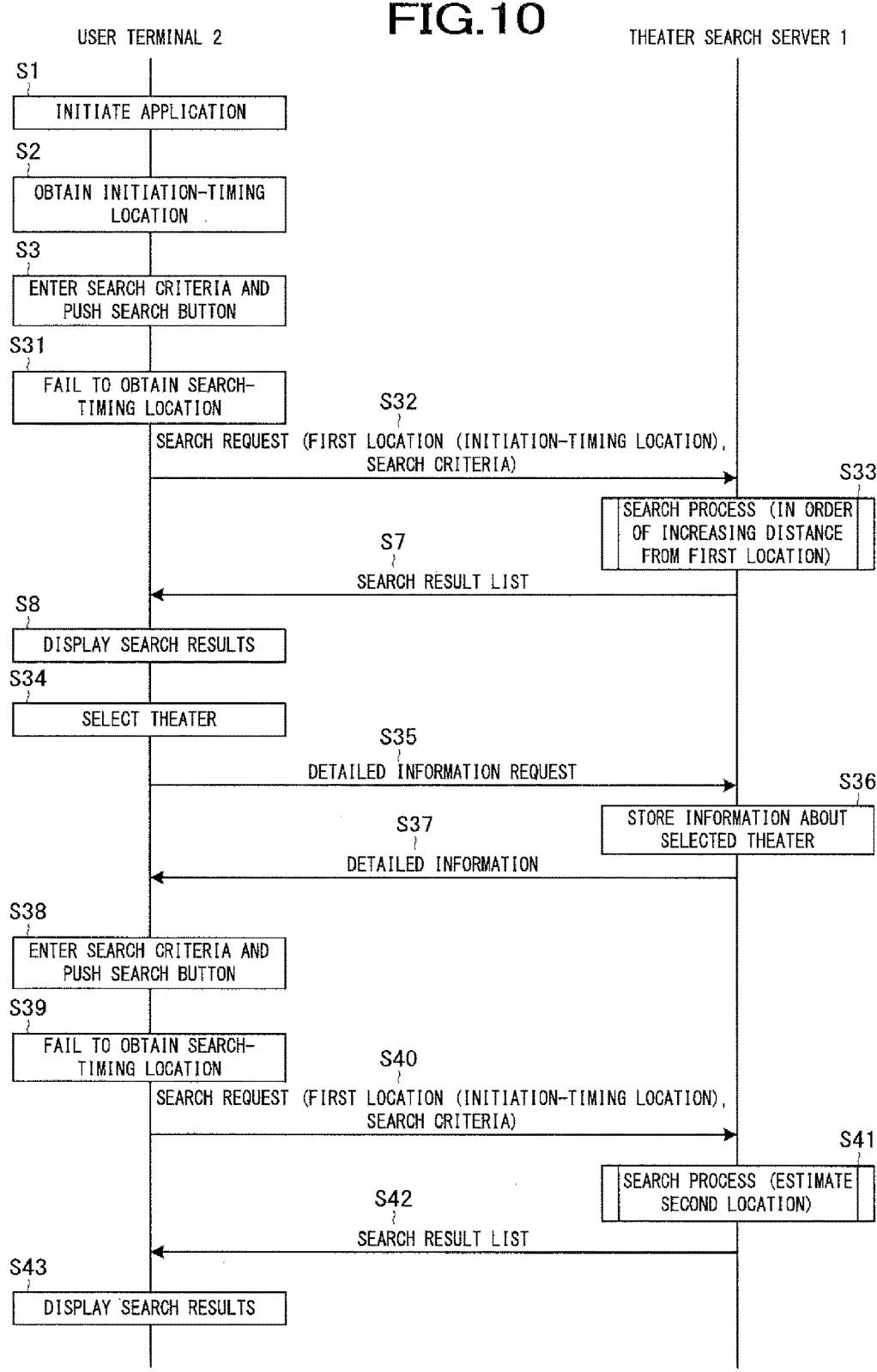
FIG. 10 is a sequence diagram showing a process overview of the information processing system S according to an embodiment.
Figure 11:
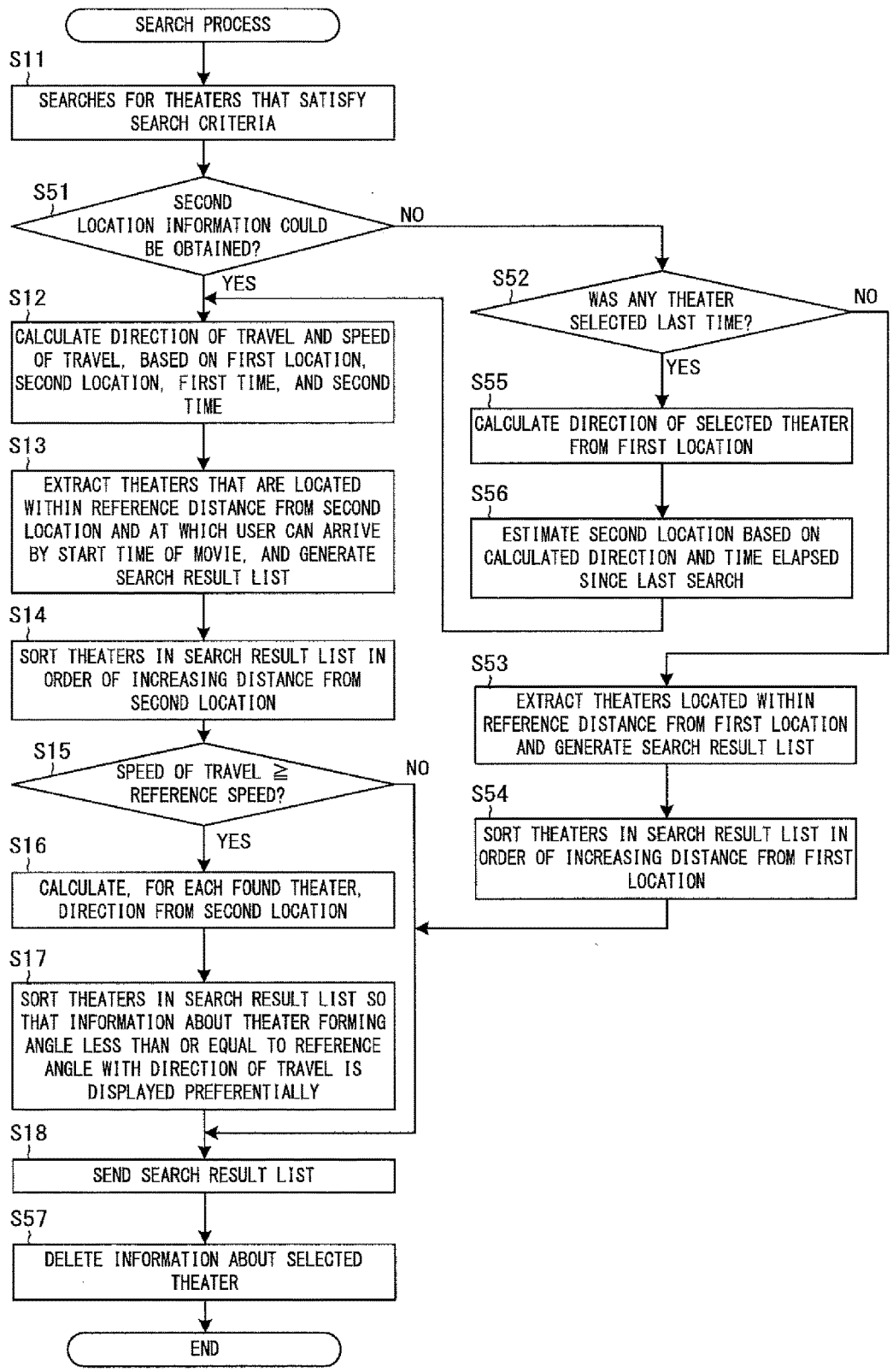
FIG. 11 is a flowchart showing an example of the search process in the system controller 14 of the theater search server 1 according to an embodiment.

The following describes a third embodiment with reference to FIGS. 9 to 11. In this embodiment, when the second location cannot be obtained, the theater search server 1 estimates the second location, and then estimates the direction in which a user will travel by using the estimated second location.

The user terminal 2 may fail to obtain its current location. For example, in some places, the user terminal 2 using a GPS may fail to receive a signal from an artificial satellite. When the second location could not be obtained, the theater search server 1 cannot estimate the direction in which the user will travel. Thus, the theater search server 1 estimates the second location based on the location of a theater selected by the user from among the theaters presented as search results.

As illustrated in FIG. 9A, for example, assume that the user initiates the theater search application in Shibuya and that the user terminal 2 can obtain the initiation-timing location as the first location at this time. Then, the user starts to travel. After that, the user U enters search criteria and requests a search. Assume that the user terminal 2 fails to obtain the search-timing location as the second location at this time. In this case, the theater search server 1 causes information about found theaters in order of increasing distance from the first location to be presented as search results. Here, assume that theaters M11, M12, and M13 are found. The user U selects, for example, the theater M13 from among the search results displayed on the user terminal 2. The user terminal 2 displays detailed information about the theater M13. The theater M13 is located, for example, in Shinjuku.

After that, the user U further travels and requests a search. Assume that the user terminal 2 fails to obtain the search-timing location as the second location also at this time. In this case, the theater search server 1 estimates that the user traveled in the direction from the first location to the theater selected from among the search results. That is, the theater search server 1 estimates that the second location is in the estimated direction from the first location. The reason is that the user is likely to have an interest in the selected theater and the area where the selected theater is located. Thus, the user is likely to travel in the direction of the selected theater. In the example of FIG. 9B, the user U is likely to travel in the direction from Shibuya to Shinjuku. The theater search server 1 estimates the distance traveled by the user, for example, based on the time elapsed from the first time to the second time at the time of the second search request. For example, the longer the elapsed time is, the longer travel distance the theater search server 1 may estimate. Alternatively, for example, the theater search server 1 may estimate that the user traveled a predetermined distance from the first location. The theater search server 1 estimates, as the second location, the location that is the estimated travel distance away from the first location in the estimated direction of travel. How to estimate the direction of the subsequent travel is the same as that in the first embodiment. In the example of FIG. 9B, the estimated second location is in Harajuku.

For example, assume that in the second search, the user U enters search criteria different from the search criteria entered in the first search. Then, for example, theaters M21, M22, and M23 are found. The theater M21 is in Shibuya, the theater M22 is in Ginza, and the theater M23 is in Ikebukuro. The theater M23 is farther from the estimated second location than the theaters M21 and M22. Shibuya and Ginza are not located in the direction from Harajuku to Shinjuku. On the other hand, Ikebukuro is located in the direction from Harajuku to Shinjuku. Thus, the theater M23 is presented in preference to the theaters M21 and M22 as search results.

FIG. 10 is a sequence diagram showing a process overview of the information processing system S according to this embodiment. In FIG. 10, the same steps as those shown in FIG. 5 are denoted by the same reference signs. As shown in FIG. 10, Steps S1 to S3 are performed. Then assume that the user terminal 2 fails to obtain the search-timing location information as the second location information (Step S31). In this case, the user terminal 2 sends a search request including the initiation-timing location information as the first location information and not including the second location information to the theater search server 1 (Step S32). Then the theater search server 1 performs a search process (Step S33). In this case, the theater search server 1 generates a search result list so that theaters are presented in order of increasing distance from the first location. Subsequently, Steps S7 and S8 are performed.

The user select any of the theaters from among the search results displayed on the screen of the user terminal 2 (Step S34). Then the user terminal 2 sends a detailed information request including the theater ID of the selected theater and the user ID of the user of the user terminal 2 to the theater search server 1 (Step S35). In the theater search server 1, the selection receiver 145 stores, in the storage unit 12, the theater ID and the user ID included in the detailed information request in association with each other (Step S36). Subsequently, the selection receiver 145 sends detailed information about the selected theater to the user terminal 2 (Step S37). The user terminal 2 displays the received detailed information.

After that, the user enters search criteria and pushes the search button (Step S38). Also in this case, assume that the user terminal 2 fails to obtain the search-timing location information as the second location information (Step S39). Thus, the user terminal 2 sends a search request including the initiation-timing location information as the first location information and not including the second location information to the theater search server 1 (Step S40). Then the theater search server 1 performs the search process (Step S41). In this case, theater ID of the selected theater is stored in the storage unit 12, so that the theater search server 1 estimates the second location by using the location of the selected theater. After the search process, the theater search server 1 sends a search result list to the user terminal 2 (Step S42). The user terminal 2 displays search results based on the received search result list (Step S43).

Although the user terminal 2 could obtain the search-timing location information at the time of the last search request, the user terminal 2 may fail to obtain the search-timing location information at the time of this search request. In such a case, the user terminal 2 may send a search request including the search-timing location information as the first location information and not including the second location information. In this case, if the user selected a theater from among the last search results, the theater search server 1 may perform the same search process as Step S41. If the user selected no theater from among the last search results, the theater search server 1 may perform the same search process as Step S33.

FIG. 11 is a flowchart showing an example of the search process in the system controller 14 of the theater search server 1 according to this embodiment. In FIG. 11, the same steps as those shown in FIG. 6 are denoted by the same reference signs. As shown in FIG. 11, after Step S11, the location obtainer 141 obtains the first location information, the first time, and the second time from the search request, and also attempts to obtain the second location information from the search request. Then, the location obtainer 141 determines whether the second location information could be obtained (Step S51). Here, if the location obtainer 141 determines that the second location information could be obtained (YES in Step S51), the process proceeds to Step S12. On the other hand, if the location obtainer 141 determines that the second location information could not be obtained (NO in Step S51), the process proceeds to Step S52.

In Step S52, the estimator 143 determines whether the user selected any theater from among the theaters found in the last search process. Specifically, if the storage unit 12 stores a theater ID in association with the user ID included in the search request, the estimator 143 determines that the user selected a theater. If the estimator 143 determines that the user selected a theater (YES in Step S52), the process proceeds to Step S55. On the other hand, if the estimator 143 determines that the user selected no theater (NO in Step S52), the process proceeds to Step S53.

In Step S53, the search unit 142 extract, from among the found theaters, theaters located within the reference distance from the first location. Then, the search unit 142 generates a search result list including pieces of information about the extracted theaters. Subsequently, the presentation controller 144 sorts the pieces of information about the theaters in the search result list in order of increasing distance from the first location (Step S54). Next, the presentation controller 144 causes the process to proceed to Step S18.

In Step S55, the estimator 143 calculates the direction of the theater selected by the user from the first location. Specifically, the estimator 143 obtains the theater ID in association with the user ID included in the search request. Subsequently, the estimator 143 retrieves the location information corresponding to the theater ID from the theater information DB 12b. Then, the estimator 143 calculates the direction of the theater selected by the user, based on the first location information and the retrieved location information.

Next, the estimator 143 estimates the second location (Step S56). For example, the estimator 143 multiplies a predetermined speed stored in the storage unit 12 by the time elapsed from the first time to the second time to calculate an estimated travel distance. Subsequently, the estimator 143 calculates the location that is the estimated travel distance away from the first location in the calculated direction of travel. The calculated location is the second location. Next, the estimator 143 causes the process to proceed to Step S12.

After Step S18, if the storage unit 12 stores a theater ID associated with the user ID included in the search request, the estimator 143 deletes this theater ID (Step S57). After Step S57, the estimator 143 terminates the search process.

As described above, according to this embodiment, when the second location cannot be obtained, the system controller 14 causes one or more theaters found in response to a search request to be presented in order of priority based on the first location, without estimating the direction of travel of a user. After that, the system controller 14 receives the selection of any theater from among the presented theater (s). Subsequently, when the second location cannot be obtained after the selection of the theater is received, the system controller 14 estimates the second location based on the first location and the location of the selected theater.

Then, the system controller 14 estimates the direction of travel of the user by using the estimated second location. Thus, even if the second location cannot be obtained, theaters to suit the convenience of the user traveling without deciding where to go can be presented.

The second and third embodiments may be performed together.

In the above embodiments, the facilities of the present invention are represented by theaters, and the events of the present invention are represented by movie shows. However, the present invention can be applied to a search for facilities other than theaters. The present invention can also be applied to any event held at a facility.

In the embodiments described above, the information processing apparatus of the present invention is applied to a server device in a client-server system. However, the information processing apparatus of the present invention may be applied to an information processing apparatus other than the server device. For example, the information processing apparatus according to the present invention may be implemented on the user terminal 2 or the like. For example, a controller included in the information processing apparatus may function as means of the present invention and thus cause display means such as a display to present search results. In this case, the display means may be included in the information processing apparatus. Alternatively, the display means may be a device separate from the information processing apparatus.

REFERENCE SIGNS LIST

1 theater search server
2 user terminal
11 communication unit
12 storage unit
12a member information DB
12b theater information DB
13 input/output interface
14 system controller
14a CPU
14b ROM
14c RAM
15 system bus
141 location obtainer
142 search unit
143 estimator
144 presentation controller
145 selection receiver
NW network
S information processing system

The invention claimed is:

1. An information processing apparatus comprising:
at least one memory configured to store program code;
at least one processor configured to access said memory, read said program code, and operate according to said program code, said program code including:
location obtaining code configured to cause at least one of said at least one processor to receive, at the server from a user terminal, wherein the user terminal is a portable terminal device, a first location of a user at a certain time and a second location of the user at a predetermined time later than the certain time, wherein the first location and the second location have been obtained by the user terminal;
request obtaining code configured to cause at least one of said at least one processor to receive, at the server from the user terminal, a facility search request;
direction estimating code configured to cause at least one of said at least one processor to:
estimate a direction in which the user will travel from the second location, based on the obtained first location and second location, and
estimate a search range D based on the estimated direction and a predetermined angle; and
control code configured to cause at least one of said at least one processor to cause the server, when a plurality of facilities found in response to the received search request include a first facility not located in the estimated search range D, and a second facility located in the estimated search range D and farther from the second location than the first facility, to transmit to the user terminal information indicating the second facility is to be presented by the user terminal in preference to the first facility as a search result.

2. The information processing apparatus according to claim 1, wherein
the location obtaining code is further configured to cause at least one of said at least one processor to further obtain a time at which the user is at the first location and a time at which the user is at the second location, and
only when a speed of travel of the user obtained based on the obtained first and second location and the obtained times is greater than or equal to a predetermined speed, the control code causes at least one of said at least one processor to transmit to the user terminal information indicating the second facility to be presented in preference to the first facility.

3. The information processing apparatus according to claim 2, wherein
the request obtaining code causes at least one of said at least one processor to receive the search request including a location of the user when the user request for the search; and
the location obtaining code causes at least one of said at least one processor to obtain, as the second location, the location included in the received search request.

4. The information processing apparatus according to claim 1, wherein
the request obtaining code causes at least one of said at least one processor to receive the search request including a location of the user when the user requests for a search for the facilities, and
the location obtaining code causes at least one of said at least one processor to obtain, as the second location, the location included in the received search request.

5. An information processing method performed by a computer, the method comprising:
obtaining, from a user terminal of a user, a first location of the user at a certain time and a second location of the user at a predetermined time later than the certain time;
obtaining a facility search request;
estimating a direction in which the user will travel from the second location, based on the obtained first location and second location;
estimating a search range D based on the estimated direction and a predetermined angle; and
when a plurality of facilities found in response to the obtained search request include a first facility not located in the estimated search range D, and a second facility located in the estimated search range D and farther from the second location than the first facility;

transmitting to the user terminal information indicating the second facility is to be presented in preference to the first facility as a search result.

6. The information processing apparatus according to claim 1, further comprising
time retrieval code configured to cause at least one of said at least one processor to retrieve, from a storage that stores start times of events to be held at facilities, start times of events to be held at facilities found in response to the search request, wherein
the control code causes at least one of said at least one processor to cause facilities at which the user can arrive before an event starts to be presented, based on the obtained second location and the retrieved start times.

7. A server comprising:
at least one memory configured to store program code;
at least one processor configured to access said memory, read said program code, and operate according to said program code, said program code including:
location obtaining code configured to cause at least one of said at least one processor to receive, at the server from a user terminal, wherein the user terminal is a portable terminal device, a first location of a user at a certain time, wherein the first location has been obtained by the user terminal;
request obtaining code configured to cause at least one of said at least one processor to receive, at the server from the user terminal, a facility search request;
direction estimating code configured to cause at least one of said at least one processor to:
estimate a second location of the user at a predetermined time later than the certain time based on the obtained first location and a location of a selected facility,
estimate a direction based on the first location and the second location, and
estimate a search range D based on the estimated direction and a predetermined angle; and
control code configured to cause at least one of said at least one processor to cause, when a plurality of facilities found in response to the search request includes: i) a first facility not located in the estimated search range D, and ii) a second facility located in the estimated search range D and farther from the second location than the first facility:
transmission of information to the user terminal, wherein the information presents the second facility in preference to the first facility as a search result.

8. The information processing apparatus according to claim 1, wherein
the location obtaining code is further configured to cause at least one of said at least one processor to further obtain a time at which the user is at the first location and a time at which the user is at the second location,
the information processing apparatus further comprises transportation estimating code configured to cause at least one of said at least one processor to estimate whether the user is taking transportation based on the obtained first and second location and the obtained times,
the transportation runs along a predetermined route and stops at a predetermined point where passengers get off,
when the transportation estimating code causes at least one of said at least one processor to estimate that the user is taking the transportation, and when a plurality of facilities found in response to the search request include a third facility located in the estimated direction and nearer to the point where passengers get off than the second facility, the control code causes at least one of said at least one processor to cause the third facility to be presented in preference to the second facility, and the third facility is farther from the second location than the second facility.

9. The information processing apparatus according to claim 1, further comprising
time retrieval code configured to cause at least one of said at least one processor to retrieve, from a storage that stores start times of events to be held at facilities, start times of events to be held at facilities found in response to the search request, wherein
the control code causes at least one of said at least one processor to cause facilities at which the user can arrive before an event starts to be presented, based on the obtained second location and the retrieved start times.

10. The information processing apparatus according to claim 2, further comprising
time retrieval code configured to cause at least one of said at least one processor to retrieve, from a storage that stores start times of events to be held at facilities, start times of events to be held at facilities found in response to the search request, wherein
the control code causes at least one of said at least one processor to cause facilities at which the user can arrive before an event starts to be presented, based on the obtained second location and the retrieved start times.

11. The information processing apparatus according to claim 8, further comprising
time retrieval code configured to cause at least one of said at least one processor to retrieve, from a storage that stores start times of events to be held at facilities, start times of events to be held at facilities found in response to the search request, wherein
the control code causes at least one of said at least one processor to cause facilities at which the user can arrive before an event starts to be presented, based on the obtained second location and the retrieved start times.

12. The information processing apparatus according to claim 2, wherein
the location obtaining code is further configured to cause at least one of said at least one processor to further obtain a time at which the user is at the first location and a time at which the user is at the second location,
the information processing apparatus further comprises transportation estimating code configured to cause at least one of said at least one processor to estimate whether the user is taking transportation based on the obtained first and second location and the obtained times,
the transportation runs along a predetermined route and stops at a predetermined point where passengers get off,
when the transportation estimating code causes at least one of said at least one processor to estimate that the user is taking the transportation, and when a plurality of facilities found in response to the search request include a third facility located in the estimated direction and nearer to the point where passengers get off than the second facility, the control code causes at least one of said at least one processor to cause the third facility to be presented in preference to the second facility, and the third facility is farther from the second location than the second facility.

13. The information processing apparatus according to claim 8, wherein the request obtaining code causes at least one of said at least one processor to receive the search request including a location of the user when the user requests the search; and the location obtaining code causes at least one of said at least one processor to obtain, as the second location, the location included in the received search request.

* * * * *